June 2, 1959  A. T. HAMPTON  2,889,448
UPSETTING METHOD AND APPARATUS
Filed Sept. 30, 1957
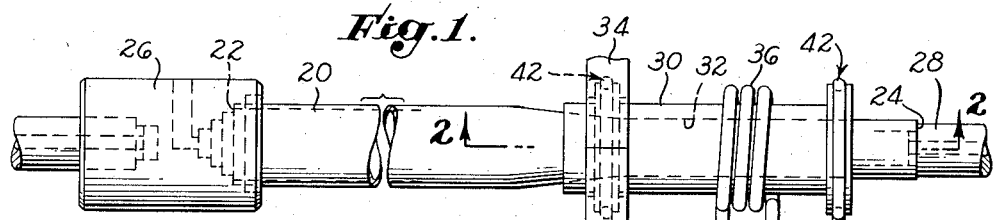
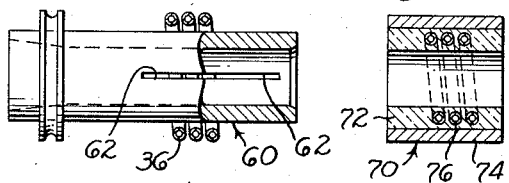
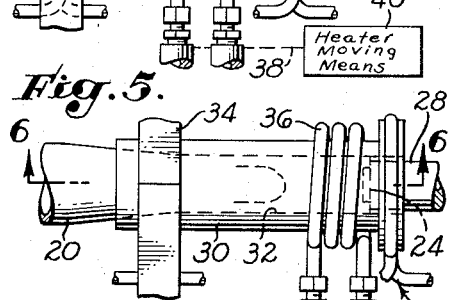
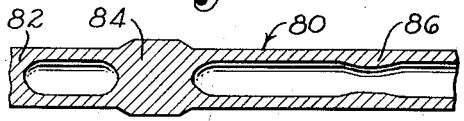
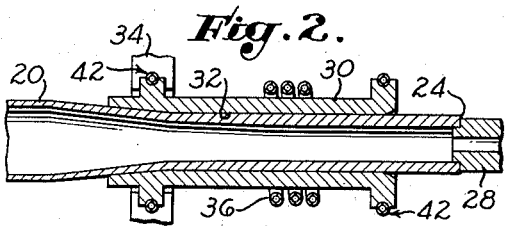
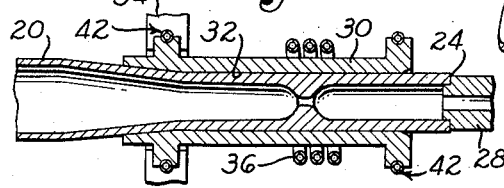
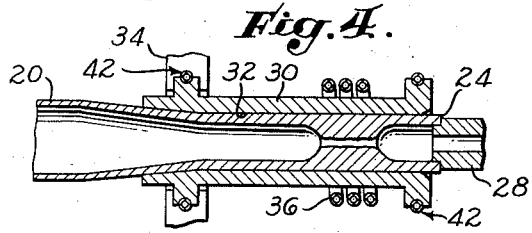
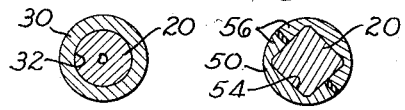
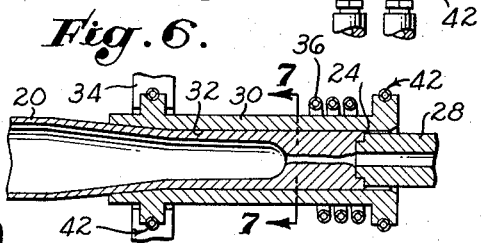
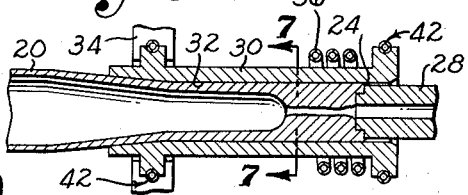
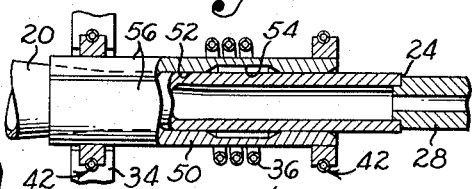
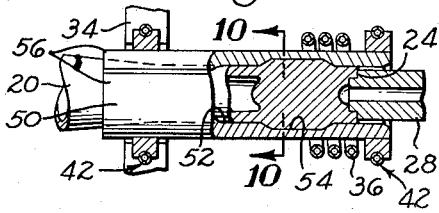
INVENTOR.
ANDREW T. HAMPTON
BY HIS ATTORNEYS.
HARRIS, KIECH, FOSTER & HARRIS

United States Patent Office 2,889,448
Patented June 2, 1959

2,889,448

UPSETTING METHOD AND APPARATUS

Andrew T. Hampton, Burbank, Calif., assignor to Darco Industries, Inc., a corporation of California Application September 30, 1957, Serial No. 687,056

9 Claims. (Cl. 219—150)

The present invention relates in general to a method of and apparatus for forming articles and, more particularly, to a method of and apparatus for upsetting elongated articles, such as tubing.

As general background, the prior art discloses upsetting tubing by heating the tubing in a heating zone spaced from one end thereof and simultaneously moving such end of the tubing axially toward the heating zone so as to progressively upset the article in the heating zone. Patent No. 2,089,912, issued August 10, 1937, to Oreste Biginelli, is illustrative of such a method and apparatus of upsetting tubing.

The foregoing conventional practice suffers from the disadvantage that each increment of the portion of the tubing which is to be upset must be moved into a stationary heating zone, as the previous increment is upset, in order to soften it sufficiently to permit upsetting thereof. Consequently, the upsetting operation is time consuming, which is undesirable. Another disadvantage of the prior practice mentioned is that all of the previously upset increments of the portion of the tubing which is to be processed are heated continuously as succeeding increments are moved into the heating zone and upset. In many instances, this results in excessive heating of the initially upset increments, which is also undesirable. Still another disadvantage of this prior practice is that the axial dimension of the final upset is restricted to a value commensurate with the axial dimension of the heating means, which limits the axial length of upset that can be produced.

A primary object of the present invention is to provide a method of and apparatus for upsetting articles, such as tubing, which utilize the general principles involved in the prior practice hereinbefore discussed, but which avoid the foregoing and various other disadvantages thereof.

More particularly, an important object of the invention is to provide a method and apparatus which differ from those hereinbefore discussed by providing additionally for progressive relative movement between the entire tubing and the heating means in a direction axially of the tubing and in a direction such as to progressively reduce the spacing between the heating means and the end of the tubing which is being moved toward the heating means as progressive increments of the tubing are upset, it being understood that this decrease in the spacing between the heating means and the specified tubing end is in addition to the decrease in spacing resulting from upsetting successive increments of the tubing.

The foregoing may be accomplished either by moving the heating means relative to the tubing as a whole, or by moving the tubing as a whole relative to the heating means, the movement in either event being in the direction of the axis of the tubing and resulting in progressively decreasing the spacing between the heating means and the tubing end in question.

The present invention thus materially reduces the time required to upset the tubing since the relative movement of the heating means and the entire tubing in a direction to decrease the spacing between the heating means and the unupset end of the tubing brings successive increments of the tubing into the heating zone at a higher rate of speed, which is an important feature. Also, this relative movement of the tubing as a whole and the heating means results in relative movement of the heating means and previously upset increments of the tubing away from each other to avoid overheating of such previously upset increments. Further, the axial dimension of the upset portion of the tubing is not limited by the axial dimension of the heating means, and is limited only by the maximum relative axial movement between the tubing as a whole and the heating means, which may be any desired value.

It will be understood that the method and apparatus of the invention may be utilized to upset the tubing sufficiently to completely close it, or to upset the tubing to an extent sufficient only to thicken the wall thereof. The extent to which the tubing is upset is determined by the extent to which the tubing is heated by the heating means, the speed of relative axial movement between the heating means and the tubing as a whole, and other factors to be considered.

The heating of the tubing takes place within an opening in a die which confines the softened increments of the tubing within the heating zone. The configuration of the die opening determines the external configuration of the upset portion or section of the tubing. Thus, the invention may be utilized to provide upset sections having a wide variety of external configurations.

Another object of the invention is to provide a die having longitudinal slots therein which tend to reduce heating of the die itself and which thus increase heating of the tubing being upset.

Another object of the invention is to provide the die with cooling means on opposite sides of the heating means to localize heating of the tubing and to limit heating thereof to the zone being upset.

The foregoing objects, advantages, features and results of the present invention, together with various other objects, advantages, features and results thereof which will be evident to those skilled in this art in the light of the present disclosure, may be attained with the exemplary embodiments of the invention described in detail hereinafter and illustrated in the accompanying drawing, in which:

Fig. 1 is a semidiagrammatic view illustrating the exterior of an apparatus of the invention capable of performing the method thereof;

Fig. 2 is a fragmentary sectional view taken along the arrowed line 2—2 of Fig. 1;

Figs. 3 and 4 are fragmentary sectional views similar to Fig. 2, but illustrating progressive upsetting of a tube in accordance with the invention;

Fig. 5 is a fragmentary view of the exterior of the apparatus which is similar to the right end of Fig. 1, but which illustrates the end of the upsetting operation, Fig. 1 illustrating the beginning thereof;

Fig. 6 is a sectional view taken along the arrowed line 6—6 of Fig. 5;

Fig. 7 is a transverse sectional view taken along the arrowed line 7—7 of Fig. 6;

Figs. 8 and 9 are fragmentary views, partially in longitudinal section and partially in elevation, illustrating progressive upsetting of a tube with another embodiment of the apparatus of the invention;

Fig. 10 is a transverse sectional view taken along the arrowed line 10—10 of Fig. 9;

Fig. 11 is a view, partially in elevation and partially in longitudinal section, of still another embodiment of the apparatus of the invention;

Fig. 12 is a longitudinal sectional view of yet another embodiment of the apparatus of the invention; and Fig. 13 is a longitudinal sectional view illustrating generally one type of tube upsetting which can be performed with the invention.

Referring first to Figs. 1 to 7 of the drawing, the numeral 20 designates a tubing which is being upset in accordance with the invention, the tubing having ends respectively identified by the numerals 22 and 24. The tubing 20 is shown as including, initially, a relatively thin-walled portion of relatively large diameter adjacent the end 22 thereof and a relatively thick-walled portion of relatively small diameter adjacent the end 24 thereof. However, it will be understood that the initial diameter and wall thickness of the tubing 20 may be uniform or may vary in other ways, the original tubing configuration being determined by the nature of the final product desired and being immaterial to the present invention.

The end 22 of the tubing 20 is seated against and is restrained against leftward axial movement by a suitable restraining structure 26, which may be the head of a hydraulic press. A ram 28, which may also form part of such a hydraulic press, is seated against the end 24 of the tubing 20, leftward movement of the ram 28 tending to move the end 24 of the tubing toward the end 22 thereof.

Intermediate the ends 22 and 24 of the tubing 20 and spaced from the end 24 thereof is a die 30 having an axial opening 32 therethrough, the tubing extending through such axial opening. The die 30 is supported by one or more suitable die holders, one such die holder being shown and being designated by the numeral 34.

Encircling and movable axially of the die 30 is a heater or heating means 36, which is shown as an induction heater. The heater 36 may be moved axially of the die 30 in any suitable manner, a diagrammatic connection 38 between the heater and a diagrammatically-illustrated heater moving means 40 being shown in Fig. 1 of the drawings.

In order to localize the heating of the tubing 20 within the die 30, the die is cooled on opposite sides of the heater 36 by cooling means 42, which are shown as comprising cooling coils encircling the die. The cooling means 42 minimize heating of the tubing 20 axially outwardly of the die 30.

The method of the invention will now be considered in conjunction with an explanation of the operation of the apparatus hereinbefore described.

Referring to Fig. 2 of the drawing, the heater 36 and the ram 28 are initially in the relative positions illustrated therein. Upon energization of the heater 36, the tubing 20 is softened within a heating zone encircled by the heater. A leftward force applied to the end 24 of the tubing 20 by the ram 28 upsets the tubing 20 within the heating zone, as illustrated in Fig. 3 of the drawing. This upsetting of the tubing 20 within the zone of influence of the heater 36 results in movement of successive, unupset increments of the tubing 20 into the heating zone as the end 24 of the tubing is moved toward the heater 36 by the ram 28.

As the end 24 of the tubing 20 is moved toward the heater 36 to upset the tubing 20 within the heating zone, the heater is moved in the opposite direction, i.e., toward the end 24 of the tubing, by the heater moving means 40. A comparison of Figs. 3, 4 and 6 of the drawing will show that the heater 36 is moved toward the right end of the die 30 a substantial distance as the right end 24 of the tubing 20 is moved toward the heater by the ram 28. Ultimately, the movement of the heater 36 toward the end 24 of the tubing 20 and the movement of the end 24 of the tubing toward the heater by the ram 28 result in the formation of an upset of substantial axial length, as shown in Fig. 6 of the drawing.

As will be apparent from a comparison of Figs. 3, 4 and 6, the heating zone is moved to the right, as viewed in the drawing, to encompass unupset increments of the tubing 20 more rapidly than would be the case if such increments were fed into the heating zone by the movement of the ram 28 alone. This has the effect of materially speeding up the upsetting process, which is an important feature. Also, as will be seen by comparing Figs. 3 and 6 in particular, the initially upset increments of the tubing 20 are removed from the heating zone as the final increments of the tubing are upset, which avoids overheating of the initially upset increments, this being another important feature. Further, it will be seen that the upset portion of the tubing in Fig. 6 has an axial length considerably greater than the axial length of the heater 36, which result would not be attainable without relative axial movement of the heater 36 and the tubing 20 as a whole.

As outlined previously herein, the relative axial movement between the heater 36 and the tubing 20 as a whole may result from movement of the heater 36 relative to the die 30 as shown, or it may result from axial movement of the die 30 and the tubing 20 relative to the heater, or both.

The extent to which the tubing 20 is upset may be varied within wide limits, the tubing having been shown in Figs. 1 to 7 of the drawing as virtually closed. However, the tubing 20 may be upset to such an extent as to completely close it, or it may be upset only slightly so as to merely thicken the wall thereof, the extent of upsetting being determined by the use to which the final product is to be put. The extent of upsetting may be controlled in various ways, as by varying the heating effect produced by the heater 36, the relative speed of axial movement of the heater 36 and the tubing 20 as a whole, the pressure exerted on the end 24 of the tubing by the ram 28, and the like.

As will be apparent, the external configuration of the upset portion of the tubing 20 is determined by the internal configuration of the portion of the die opening 32 which comes within the field of influence of the heater 36. In the particular construction illustrated, the zone of the die opening 32 in question is circular in cross section and of constant diameter.

In Figs. 8 to 10 of the drawing is shown a die 50 which is provided with a die opening 52 having in the wall thereof a cavity 54 of square cross section, which results in the formation of an upset of complementary configuration on the tubing 20. Also, in this instance, the upset is shown as completely closing the tubing. In order to permit removal of the upset tubing 20 from the die 50 of Figs. 8 to 10, this die is split longitudinally into two halves 56.

In Fig. 11 of the drawing is shown a die 60 which is similar to the die 30, but which is provided with longitudinal slots 62 therein. These slots tend to reduce the heating of the die 60 by the heater 36 and thus to increase the heating of a tubing within the die.

In Fig. 12 of the drawing is shown a die 70 which includes an inner sleeve 72 of a ceramic material, and an outer, reinforcing sleeve 74, a heater 76 being embedded in the inner sleeve. With this construction, relative axial movement between the entire die 70, including the heater 76 therein, relative to the tubing to be upset is produced during the upsetting operation, either by moving the tubing as a whole relative to the die 70, or by moving the die 70 axially relative to the tubing, or both.

Fig. 13 of the drawing illustrates an example of the type of upsetting which may be accomplished with the present invention, this figure showing that a tubing 80 may be provided with varying numbers of upsets of varying configurations. For example, shown is an internal upset 82 which completely closes the interior of the tubing, an internal-external upset 84 which completely closes the interior of the tubing and which enlarges the exterior thereof, and an internal upset 86 which has the effect of merely thickening the wall of the tubing. The original wall thickness of the tubing 80 is maintained between the upsets 82 and 84 and the upsets 84 and 86. An article of this nature may be produced readily with the present invention by employing a single die and by providing an extended range of relative axial movement between the heater and the tubing as a whole, the original wall thickness being preserved between the upsets 82, 84 and 84, 86 either by periodically de-energizing the heater, or by increasing the speed of relative movement of the heater and the tubing as a whole to such a value that no upsetting takes place.

Thus, it will be seen that the present invention is susceptible of a wide variety of potential applications. Although various exemplary embodiments of the invention have been specifically disclosed herein for purposes of illustration, it will be understood that various changes, modifications and substitutions may be incorporated in such embodiments without departing from the spirit of the invention as defined by the claims which follow.

I claim:

1. A method of modifying the cross-sectional configuration of an article in a plane perpendicular to an axis of the article, said method being characterized by the use of a heating means and including the steps of: heating the article with said heating means in a heating zone on the axis of the article to soften the article in said heating zone; moving a portion of the article axially of the article toward said heating zone to upset the article in said heating zone; and progressively relatively moving the entire article and said heating means axially of the article so as to progressively relatively move the entire article and the heating zone axially of the article.

2. A method of upsetting an elongated article, characterized by the use of a heating means and including the steps of: heating the article with said heating means in a heating zone spaced from one end of the article to soften the article in said heating zone; moving said one end of the article axially of the article toward said heating zone to upset the article in said heating zone; and progresssively relatively moving the entire article and said heating means axially of the article in such a direction as to decrease the spacing between said heating means and said one end of the article, whereby to progressively relatively move the entire article and the heating zone axially of the article in a direction such as to decrease the spacing of the heating zone and said one end of the article.

3. In an apparatus for upsetting an elongated article, the combination of: heating means for heating the article in a heating zone spaced from one end of the article to soften the article in said heating zone; means engageable with the article for moving said one end thereof axially of the article toward said heating zone to upset the article in said heating zone; and means for progressively relatively moving the article and said heating means axially of the article in such a direction as to decrease the spacing between said heating means and said one end of the article, whereby to progressively relatively move the entire article and said heating zone axially of the article in a direction to decrease the spacing between said heating zone and said one end of the article.

4. In an apparatus for upsetting an elongated article, the combination of: a die having an opening adapted to receive at least a portion of the article therein; heating means encircling said opening in said die for softening the article within said opening; means engageable with the article for moving an end of the article axially of the article toward said die so as to upset the article within said opening; and means for progressively relatively moving the entire article and said heating means axially of the article in a direction such as to decrease the spacing between said heating means and said end of the article.

5. In an apparatus for upsetting an elongated article, the combination of: of a die having an opening adapted to receive at least a portion of the article therein; heating means encircling said opening in said die for softening the article within said opening; means engageable with the article for moving an end of the article axially of the article toward said die so as to upset the article within said opening; and means for progressively relatively moving said die and said heating means axially of the article in a direction such as to decrease the spacing between said heating means and said end of the article, the article as a whole being immovable relative to said die.

6. In an apparatus for upsetting an elongated article, the combination of: a die having an opening adapted to receive at least a portion of the article therein; heating means encircling said opening in said die for softening the article within said opening; means engageable with the article for moving an end of the article axially of the article toward said die so as to upset the article within said opening; and means for progressively relatively moving said die and said heating means and the entire article axially of the article in a direction such as to decrease the spacing between said die and said heating means and said end of the article, said die and the article as a whole being relatively movable axially of the article.

7. In an apparatus for upsetting an elongated article, the combination of: a die having an opening adapted to receive at least a portion of the article therein; heating means encircling said opening in said die for softening the article within said opening; means engageable with the article for moving an end of the article axially of the article toward said die so as to upset the article within said opening; and means for progressively moving said heating means relative to said die and relative to the article as a whole axially of the article in a direction such as to reduce the spacing between said heating means and said end of the article.

8. An apparatus according to claim 4 wherein said die is provided with longitudinal slots therein.

9. In an apparatus for upsetting an elongated article, the combination of: a die having an opening adapted to receive at least a portion of the article therein; heating means encircling said opening in said die for softening the article within said opening; means engageable with the article for moving an end of the article axially of the article toward said die so as to upset the article within said opening; and means for progressively relatively moving the entire article and said heating means axially of the article.

References Cited in the file of this patent

UNITED STATES PATENTS

| Re. 23,092 | Berliner | Mar. 22, 1949 |
| 1,772,444 | Giacchino | Aug. 5, 1930 |
| 2,275,763 | Howard et al. | Mar. 10, 1942 |
| 2,598,016 | Richardson | May 27, 1952 |

Disclaimer 2,889,448.—*Andrew T. Hampton*, Burbank, Calif. UPSETTING METHOD AND APPARATUS. Patent dated June 2, 1959. Disclaimer filed Apr. 13, 1961, by the assignee, *Darco Industries, Inc.*

Hereby enters this disclaimer to claims 1, 2, and 3 of said patent.
 [*Official Gazette May 16, 1961.*]